Dec. 8, 1959  D. W. SMITH  2,916,577
FLUID PRESSURE RESPONSIVE SWITCH
Filed May 6, 1958
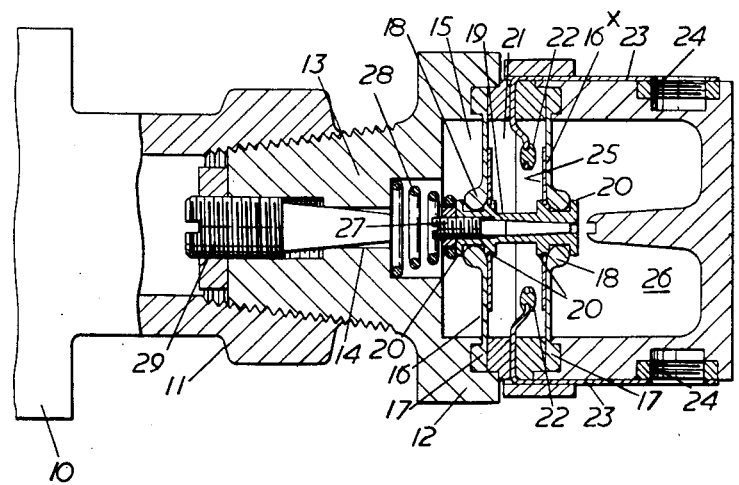
Inventor
DAVID WILLIAM SMITH
By
Aaron R. Townshend  Attorney

United States Patent Office 2,916,577
Patented Dec. 8, 1959

2,916,577

FLUID PRESSURE RESPONSIVE SWITCH

David William Smith, Harlow, England, assignor to The British Oxygen Company Limited, a British company Application May 6, 1958, Serial No. 733,334

Claims priority, application Great Britain May 6, 1957

5 Claims. (Cl. 200—83)

This invention relates to fluid pressure responsive switches. Such switches may be used for example with fluid pressure regulators to operate in response to a variation in the regulated pressure which may for example be due to the pressure drop with demand or to failure of the regulator. For instance, in pressure regulators adapted to deliver a gas at relatively low constant pressure from a high pressure source in which pressure reduction is effected in two stages, it is sometimes desirable to provide means for indicating a sudden drop in the first stage pressure. Operation of the switch may be arranged to open or close an electrical indicating circuit, or it may be arranged to actuate a valve or other mechanical element.

According to the present invention a fluid pressure responsive switch comprises an inlet adapted to be connected to a source of fluid pressure, a control chamber, a pressure responsive member movable in response to the establishment of a predetermined minimum pressure differential between said inlet and said control chamber to operate a switch, and a passage which provides restricted communication between the inlet and the control chamber and is of such characteristics that a sudden and substantial pressure variation in the source of fluid pressure is required to cause sufficient movement of the pressure responsive member to operate the switch.

According to a feature of the invention adjustable flow-restricting means are provided in the passage, whereby the rate of fluid flow through the passage can be varied so as to control the duration of operation of the switch after a predetermined minimum differential pressure has been established between the inlet and the control chamber.

According to another feature of the invention adjustable flow restricting means are provided between the source of fluid pressure and the inlet.

An embodiment of the invention will now be described with reference to the accompanying drawing, which is a cross-sectional view of a pressure responsive electrical switch.

Referring to the drawing, a portion of the body of a two stage pressure regulator is indicated at 10, and the boss 11 thereon communicates with the first pressure stage of the regulator. The switch housing 12 is hollow and has a screw-threaded boss 13 which screws into the correspondingly screw-threaded bore of the boss 11 on the regulator body 10. An axial bore 14 in the boss 13 opens into an internal chamber 15 in the switch housing 12, the bore 14 and chamber 15 together providing an inlet which is connected to a source of fluid pressure viz. the first pressure stage of the regulator 10.

The switch housing 12 is of hollow cylindrical form, and two spaced parallel transverse diaphragms 16 and 16$^x$ of annular form are disposed across the space within the housing. Each diaphragm has a beaded outer edge 17 which is gripped between parts of the housing 12 to support the diaphragms, and each diaphragm also has a beaded inner edge 18. A bobbin member 19 is provided with flanges 20 between which the inner beaded edges 18 of diaphragms 16 and 16$^x$ are engaged, so that the bobbin is supported by the diaphragms in apertures at the centres of the diaphragms.

The space 21 between the diaphragms contains a pair of electrical contacts 22 which form part of an indicating circuit (not shown), and connections 23 extend from the switch contacts 22 to external terminals 24. A contact plate 25 carried by the bobbin member 19, and in face-to-face relationship with the diaphragm 16$^x$, is adapted to bridge the contacts 22 when the diaphragm assembly is caused to flex as hereafter described.

The space 26 on the opposite side of the diaphragm assembly to the chamber 15 is a control chamber, and the bobbin member 19 is tubular so that pressure fluid entering the chamber 15 through the bore 14 also reaches the control chamber 26 through the bore of the bobbin member 19. The bore of the bobbin member 19 is partly screw-threaded and it houses a bleed screw 27, the function of which is to obturate the hollow bobbin member 19 and therefore provide restricted communication between the inlet chamber 15 and the control chamber 26.

A spring 28 acts on the bobbin member 19 in a direction tending to keep the contact plate 25 out of engagement with the switch contacts 22.

The source of fluid pressure in the inlet constituted by the bore 14 and chamber 15 pressurises the chamber 15 and also the control chamber 26 through the restricted bore of the bobbin member 19, and since this pressure is equal on opposite sides of the diaphragm assembly, there is no force tending to flex the assembly. If, however, there is a sudden drop of pressure in the inlet chamber 15, the unbalanced higher pressure existing in the control chamber 26 flexes the diaphragm assembly to cause the plate 25 to bridge the contacts 22, providing that the pressure differential between the inlet chamber 15 and the control chamber 26 is sufficient to overcome the resistance of the spring 28 and to flex the diaphragms 16 and 16$^x$. Unless this minimum differential pressure is attained there will be no bridging of the contacts 22, and therefore the switch will be insensitive to minor fluctuations in pressure in the source of fluid pressure.

The diaphragms 16 and 16$^x$ will remain in their flexed positions with the plate 25 bridging the contacts 22 until such time as pressure balance is restored between the chambers 15 and 26 due to leakage of pressure fluid from the chamber 26 past the bleed screw 27, or due to the restoration of normal pressure in the chamber 15.

The bleed screw 27 is adjustable in the bore of the bobbin member 19 so that the rate of escape of pressure from the control chamber 26 can be varied, thereby varying the duration of time of bridging of the contacts 22 for each operation of the switch.

The bore 14 in the boss 13 of the switch also houses an adjustable bleed screw 29 which restricts flow between the source of fluid pressure and the inlet chamber 15. Adjustments of the bleed screw 29 affect the sensitivity of the switch to pressure changes in the source of fluid pressure.

The space between the two diaphragms 16 and 16$^x$ could be filled with an inert gas to suppress sparking. However, in the case where the regulated pressure is a gauge pressure, that is at a constant differential pressure with respect to the ambient atmospheric pressure, and the ambient atmospheric pressure varies over a large range, due for example to the regulator being fitted in an aircraft capable of attaining high altitudes, then the space between the diaphragms will preferably be vented to atmosphere. The pressure differential across any one of the two diaphragms 16 will then remain constant with altitude and so preserve the sensitivity of the switch with respect to altitude.

The switch which has just been described is suitable for use with a two stage pressure regulator delivering a gas such as breathing oxygen at reduced pressure and the switch can be used to operate an indicator to show that oxygen is being delivered during each inhalation of the user of the breathing equipment in which the regulator is incorporated.

The employment of the invention is not confined to this use, however, since there are other circumstances in which it may be necessary to indicate a sudden pressure drop in a source of fluid pressure.

What I claim is:

1. In a fluid pressure responsive switch, the combination of a hollow housing, a pressure-responsive member defining with said housing a control chamber and an inlet chamber having an inlet for connection with a fluid pressure source, means providing constant restricted communication between said inlet chamber and the control chamber, the sole inlet and outlet for pressure fluid to and from said control chamber being via said restricted communication means and switch means actuable by movement of said pressure-responsive member in response to the establishment of a pressure differential between the inlet chamber and the control chamber, said restricted communication means exercising a degree of pressure fluid flow control between said chambers such that a sudden and substantial pressure variation in the fluid pressure source is required to establish a predetermined minimum pressure differential between said chambers sufficient to cause the necessary amount of movement of the pressure-responsive member to actuate the switch means, said restricted communication means having a passage for fluid flow therethrough, and adjustable flow-restricting means being provided in said passage.

2. In a fluid pressure responsive switch, the combination of a hollow housing, a pressure responsive member defining with said housing a control chamber and an inlet chamber having an inlet for connection with a fluid pressure source, adjustable flow-restricting means between said inlet and the inlet chamber, means providing constant restricted communication between said inlet chamber and the control chamber, the sole inlet and outlet for pressure fluid to and from said control chamber being via said restricted communication said restricted communication means having a passage for fluid flow therethrough, adjustable flow-restricting means in said passage and switch means actuable by movement of said pressure responsive member in response to the establishment of a predetermined minimum pressure differential between the inlet chamber and the control chamber due to a sudden substantial pressure drop in said fluid pressure source.

3. In a fluid pressure responsive switch, the combination of a hollow housing, two spaced parallel diaphragms transversely disposed in said housing and defining with said housing an interspace between the diaphragms, a control chamber between one diaphragm and one end of the housing and an inlet chamber between the other diaphragm and the other end of the housing, adjustable flow-restricting means between said inlet chamber and an inlet in the said other end of the housing for connection with a fluid pressure source, a tubular bobbin member which is secured to the two diaphragms so that it bridges said interspace with its bore providing constant communication between said chamber, adjustable flow-restricting means in the bore of said bobbin member, and switch means in said interspace actuable by movement of said diaphragms in response to the establishment of a predetermined minimum pressure differential between the inlet chamber and the control cheamber due to a sudden substantial pressure drop in said fluid pressure source.

4. A fluid pressure responsive switch according to claim 3, wherein the space between the diaphragms contains an inert gas.

5. In a fluid pressure responsive switch, the combination of a hollow housing, two spaced parallel diaphragms transversely disposed in said housing and defining with said housing an interspace between the diaphragms, a control chamber between one diaphrgam and one end of the housing and an inlet chamber between the other diaphragm and the other end of the housing, adjustable flow-restricting means between said inlet chamber and an inlet in the said other end of the housing for connection with a fluid pressure source, a tubular bobbin member which is secured to the two diaphragms so that it bridges said interspace with its bore providing constant communication between said chambers, adjustable flow-restricting means in the bore of said bobbin member, a pair of electrical contacts in said interspace, and a contact plate which moves with said diaphragms and is adapted to bridge said contacts.

References Cited in the file of this patent

UNITED STATES PATENTS

| | | |
|---|---|---|
| 2,350,938 | Sparrow | June 6, 1944 |
| 2,371,669 | Baak | Mar. 20, 1945 |
| 2,450,961 | Heymann et al. | Oct. 12, 1948 |
| 2,537,474 | Mejean | Jan. 9, 1951 |
| 2,786,109 | Eskew | Mar. 19, 1957 |
| 2,803,724 | Forwald | Aug. 20, 1957 |